US008742678B2

(12) United States Patent
Zhang et al.

(10) Patent No.: US 8,742,678 B2
(45) Date of Patent: Jun. 3, 2014

(54) DISCHARGE LAMP SYSTEM FOR CONSTANT POWER CONTROL AND CONTROLLING METHOD OF THE SAME

(75) Inventors: Qi Zhang, Shanghai (CN); Wei-Qiang Zhang, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 296 days.

(21) Appl. No.: 13/241,247

(22) Filed: Sep. 23, 2011

(65) Prior Publication Data

US 2013/0020953 A1 Jan. 24, 2013

(30) Foreign Application Priority Data

Jul. 18, 2011 (CN) .......................... 2011 1 0201143

(51) Int. Cl.
*H02M 3/156* (2006.01)
(52) U.S. Cl.
USPC ........ 315/247; 315/291; 315/307; 315/209 R; 315/224
(58) Field of Classification Search
USPC .............. 315/291, 307–326, 276–279, 185 S, 315/224, 225, 247, 200 R
See application file for complete search history.

(56) References Cited

U.S. PATENT DOCUMENTS

| 7,368,881 | B2 * | 5/2008 | Suganuma et al. | 315/291 |
| 7,400,100 | B2 * | 7/2008 | Takezawa | 315/307 |
| 7,923,940 | B2 * | 4/2011 | Okawa | 315/224 |
| 2002/0047641 | A1 * | 4/2002 | Ito et al. | 315/307 |
| 2007/0228998 | A1 | 10/2007 | Takezawa | |

FOREIGN PATENT DOCUMENTS

| JP | 2008-198622 | 8/2008 |
| JP | 2009-289664 | 12/2009 |
| JP | 2011-138652 | 7/2011 |
| TW | 200629028 | 8/2006 |

* cited by examiner

*Primary Examiner* — Tuyet Thi Vo
(74) *Attorney, Agent, or Firm* — CKC & Partners Co., Ltd.

(57) ABSTRACT

A discharge lamp system includes a discharge lamp; a power supply device for providing DC input voltage and current; a converter connected to the discharge lamp and the power supply device for providing power for the discharge lamp; a DC input voltage detecting unit connected to the power supply device for detecting the DC input voltage; a DC input current detecting unit connected to the power supply device for detecting the DC input current; a lamp state detecting unit for detecting a signal responsive to the lamp state; a controller connected to the converter, the DC input voltage detecting unit, the DC input current detecting unit and the lamp state detecting unit for controlling the discharge lamp according to the signal responsive to the lamp state, the DC input voltage and the DC input current. A controlling method for the discharge lamp system is also disclosed herein.

20 Claims, 8 Drawing Sheets

DISCHARGE LAMP SYSTEM FOR CONSTANT POWER CONTROL AND CONTROLLING METHOD OF THE SAME

RELATED APPLICATIONS

This application claims priority to China Patent Application Serial Number 201110201143.5, filed Jul. 18, 2011, which is herein incorporated by reference.

BACKGROUND

1. Technical Field

The present disclosure relates generally to a discharge lamp system, and more particularly to a discharge lamp system in which a constant power control of a discharge lamp is performed. The present disclosure relates also to a controlling method for the discharge lamp system.

2. Description of Related Art

Conventionally, high intensity discharge (HID) lamps have relatively high efficiency, good color rendering, and a long service life, such that HID lamps are widely used in many applications.

Figure 1:
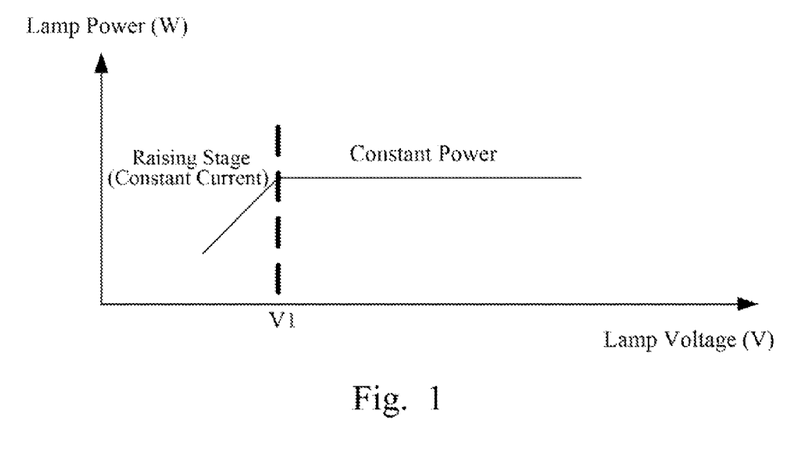
FIG. 1 shows a waveform diagram of a typical procedure for controlling a discharge lamp according to the prior art.

However, an HID lamp is a relatively complex load, and the parameters (voltage, current and power) of the discharge lamp are often changed within an operation time period. A waveform diagram of a typical procedure for controlling a discharge lamp is shown in FIG. 1. When the discharge lamp is operated at a raising stage after the discharge lamp is ignited, the discharge lamp is operated under a constant current mode, and a discharge lamp power will increase gradually (at a constant current stage) with an increasing discharge lamp voltage ($V_{lamp}$). For acquiring a better discharge lamp performance, when the discharge lamp voltage is greater than a first predetermined value V1, a constant power control stage is entered, where the discharge lamp voltage will continue rising until a lamp impedance has a stable value. At this moment, the discharge lamp power is adjusted under an operation of a constant power. Over the lifetime of the discharge lamp, the lamp impedance of the discharge lamp will increase with an increasing lamp operating time, and thus the discharge lamp voltage will rise with the increasing lamp operating time. However, the discharge lamp power is controlled so as to have a constant value.

Usually, the discharge lamp voltage ($V_{lamp}$) and a discharge lamp current ($I_{lamp}$) are detected directly for the constant power control of the discharge lamp by a computation process when the discharge lamp is operated at the constant power stage. However, $V_{lamp}$ and $I_{lamp}$ are difficult to directly detect in some real-life applications, and thus it is a challenge to perform constant power control of the discharge lamp by detecting $V_{lamp}$ and $I_{lamp}$ directly.

Figure 2:
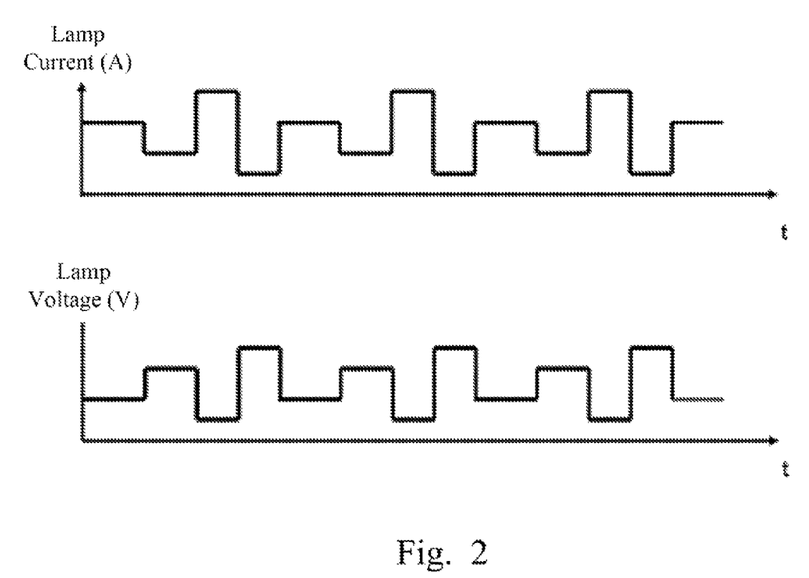
FIG. 2 shows voltage and current waveform diagrams of a discharge lamp of a projection system in the prior art.

Furthermore, in other applications of the discharge lamp, such as in a projector system, the discharge lamp can emit different colors of light based on different lamp currents. As shown in FIG. 2, discharge lamp voltage ($V_{lamp}$) and discharge lamp current ($I_{lamp}$) waveform diagrams are shown within a specific time period. It can be seen that the discharge lamp voltage and the discharge lamp current are continuously transitioning and they are unable to be maintained at a constant value. Under such conditions, if constant power control is performed directly for the discharge lamp, accuracy issues will be encountered.

SUMMARY

The present disclosure provides a discharge lamp system and thereby solves the foregoing technical issues.

One aspect of the present disclosure is to provide a discharge lamp system including a discharge lamp, a power supply device, a converter, a DC input voltage detecting unit, a DC input current detecting unit, a lamp state detecting unit and a controller. The power supply device is configured for providing a DC input voltage and a DC input current. The converter is connected to the power supply device and the discharge lamp, for providing power to the discharge lamp. The DC input voltage detecting unit is connected to the power supply device, for detecting the DC input voltage. The DC input current detecting unit is connected to the power supply device, for detecting the DC input current. The lamp state detecting unit is configured for detecting a signal responsive to a lamp state. The controller is connected to the converter, the DC input voltage detecting unit, the DC input current detecting unit and the lamp state detecting unit, for controlling the discharge lamp through the converter according to the DC input voltage, the DC input current and the signal responsive to the lamp state.

According to one embodiment of the present disclosure, the controller performs a constant power control of the discharge lamp through the converter.

According to one embodiment of the present disclosure, the converter performs a compensation of the DC input voltage, the DC input current and the lamp state, and thereby achieves the constant power control of the discharge lamp.

According to one embodiment of the present disclosure, the compensation of the DC input voltage, the DC input current and the lamp state is a linear compensation or a non-linear compensation.

According to one embodiment of the present disclosure, the lamp state detecting unit is configured for detecting a duty ratio signal generated by the controller or detecting a signal responsive to a lamp voltage.

According to one embodiment of the present disclosure, the converter is a half-bridge inverter including two switches.

According to one embodiment of the present disclosure, the controller includes a microprocessor, a controlling unit and a driver. The microprocessor is configured to process the DC input voltage, the DC input current and the signal responsive to the lamp state to generate a processing signal. The controlling unit is configured for generating a controlling signal according to the processing signal. The driver is configured for generating a driving signal according to the controlling signal, and the driving signal drives the switches.

According to one embodiment of the present disclosure, the lamp state detecting unit is a duty ratio detecting unit, for detecting the controlling signal and thereby acquiring the duty ratio of the driving signal corresponding to the switches, and for providing the signal responsive to the lamp state corresponding to the duty ratio of the driving signal.

According to one embodiment of the present disclosure, the converter is a full-bridge inverter including two high-frequency switches and two low-frequency switches.

According to one embodiment of the present disclosure, the controller includes a microprocessor, a controlling unit, a first driver and a second driver. The microprocessor is configured to process the DC input voltage, the DC input current and the signal responsive to the lamp state to generate a processing signal. The controlling unit is configured for generating a first controlling signal and a second controlling signal according to the processing signal. The first driver receives the first controlling signal and thereby generates a first driving signal corresponding to the first controlling signal to drive the high-frequency switches, and the second driver receives the second controlling signal and thereby generates a second driving signal corresponding to the second controlling signal to drive the low-frequency switches.

According to one embodiment of the present disclosure, the lamp state detecting unit is a duty ratio detecting unit, for detecting the first controlling signal and thereby acquiring the duty ratio of the first driving signal corresponding to the high-frequency switches, and for providing the signal responsive to the lamp state corresponding to the duty ratio of the first driving signal.

According to one embodiment of the present disclosure, the converter includes a DC-DC converter.

According to one embodiment of the present disclosure, the DC-DC converter is a buck converter.

According to one embodiment of the present disclosure, the lamp state detecting unit is an output voltage detecting unit, for detecting an output voltage of the buck converter, and for providing the signal responsive to the lamp state according to the output voltage.

According to one embodiment of the present disclosure, the power supply device includes an AC power source and a rectifier. The AC power source is configured for providing an AC power. The rectifier is connected to the AC power source, for converting the AC power into a DC power.

According to one embodiment of the present disclosure, the power supply device further includes a power factor correction circuit. The power factor correction circuit is connected to the rectifier, for providing the DC input voltage.

According to one embodiment of the present disclosure, the power supply device is a DC power source.

According to one embodiment of the present disclosure, the signal responsive to the lamp state is a voltage signal or a current signal.

According to one embodiment of the present disclosure, the discharge lamp is a high intensity discharge lamp.

Another aspect of the present disclosure is to provide a method for controlling the discharge lamp system in one embodiment of the present disclosure. The method includes detecting the DC input voltage, the DC input current and the signal responsive to the lamp state. Next, a controlling signal is obtained according to the DC input voltage, the DC input current and the signal responsive to the lamp state, and thus, the discharge lamp is controlled by the controlling signal.

According to one embodiment of the present disclosure, the operation of controlling the discharge lamp is a constant power control operation.

According to one embodiment of the present disclosure, the constant power control operation includes performing a compensation of the DC input voltage, the DC input current and the lamp state.

According to one embodiment of the present disclosure, the signal responsive to the lamp state is a duty ratio signal.

According to one embodiment of the present disclosure, the signal responsive to the lamp state is a signal responsive to a lamp voltage.

In the discharge lamp system and the controlling method thereof of the present disclosure, compensation of one or more of the DC input voltage, the DC input current and the signal responsive to the lamp state is performed so as to control the input power and thereby realize indirect constant power control of the discharge lamp. It can be seen from experimental data provided hereinafter that the discharge lamp can be controlled stably by utilizing the techniques described in the present disclosure.

It is to be understood that both the foregoing general description and the following detailed description are by examples, and are intended to provide further explanation of the invention as claimed.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

Figure 3:
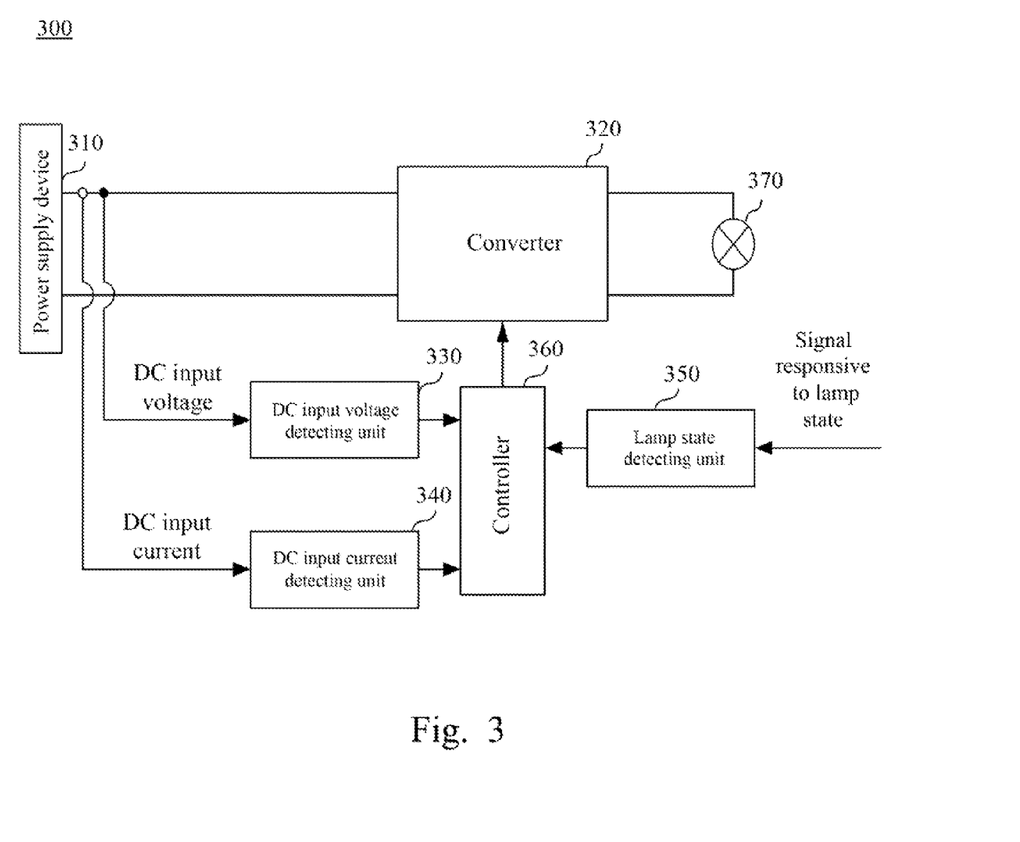
FIG. 3 shows a block diagram of a discharge lamp system according to the present disclosure.

Referring to FIG. 3, a block diagram will be described that illustrates a discharge lamp system 300 in the present disclosure. The discharge lamp system 300 includes a power supply device 310, a converter 320, a DC input voltage detecting unit 330, a DC input current detecting unit 340, a lamp state detecting unit 350, a controller 360 and a discharge lamp 370.

The power supply device 310 is configured for providing a DC input voltage and a DC input current. One side of the converter 320 is connected to the power supply device 310, for receiving the DC input voltage provided by the power supply device 310. The other side of the converter 320 is connected to the discharge lamp 370, for converting the DC input voltage provided by the power supply device 310 into a voltage required by the discharge lamp 370, and for providing a power required by the discharge lamp 370. The DC input voltage detecting unit 330 is connected to the power supply device 310, for detecting the DC input voltage and for outputting a corresponding DC input voltage detection signal. The DC input current detecting unit 340 is connected to the power supply device 310, for detecting the DC input current and for outputting a corresponding DC input current detection signal. The lamp state detecting unit 350 is configured for detecting a signal responsive to a lamp state and for outputting a corresponding lamp state detection signal. The controller 360 is connected to the converter 320, the DC input voltage detecting unit 330, the DC input current detecting unit 340 and the lamp state detecting unit 350, for generating a controlling signal according to the DC input voltage detection signal provided by the DC input voltage detecting unit 330, the DC input current detection signal provided by the DC input current detecting unit 340 and the lamp state detection signal. The controller 360 controls the discharge lamp 370 through the converter 320 using the controlling signal. Control of the discharge lamp 370 by the controller 360 may involve, for example, a constant power control operation. Specifically, the constant power control operation is realized by performing compensation of the DC input voltage, the DC input current and the lamp state. While the discharge lamp 370 can be a high intensity discharge lamp, the present disclosure is not limited in this regard.

Figure 4:
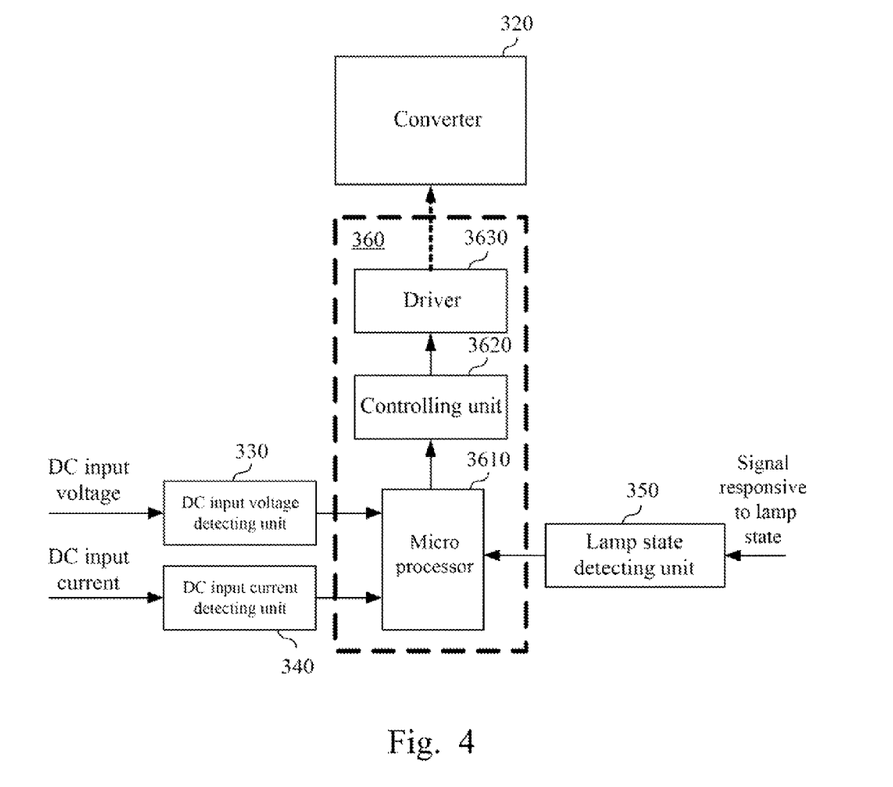
FIG. 4 shows a block diagram which illustrates in greater detail a controller in the discharge lamp system according to one embodiment of the present disclosure.

Referring to FIG. 4, a block diagram will be described that illustrates in greater detail a controller in the discharge lamp system 300 according to one embodiment of the present disclosure. The controller 360 includes a microprocessor 3610, a controlling unit 3620 and a driver 3630. The microprocessor 3610 is connected to the DC input voltage detecting unit 330, the DC input current detecting unit 340 and the lamp state detecting unit 350 to process the DC input voltage detection signal, the DC input current detection signal and the lamp state detection signal, and thereby generates a processing signal. The controlling unit 3620 is connected to the microprocessor 3610, for generating a controlling signal according to the processing signal. The driver 3630 is connected to the controlling unit 3620, for generating a driving signal corresponding to the controlling signal. As an example, the driving signal can be used to drive a switch in the converter 320.

Figure 5:
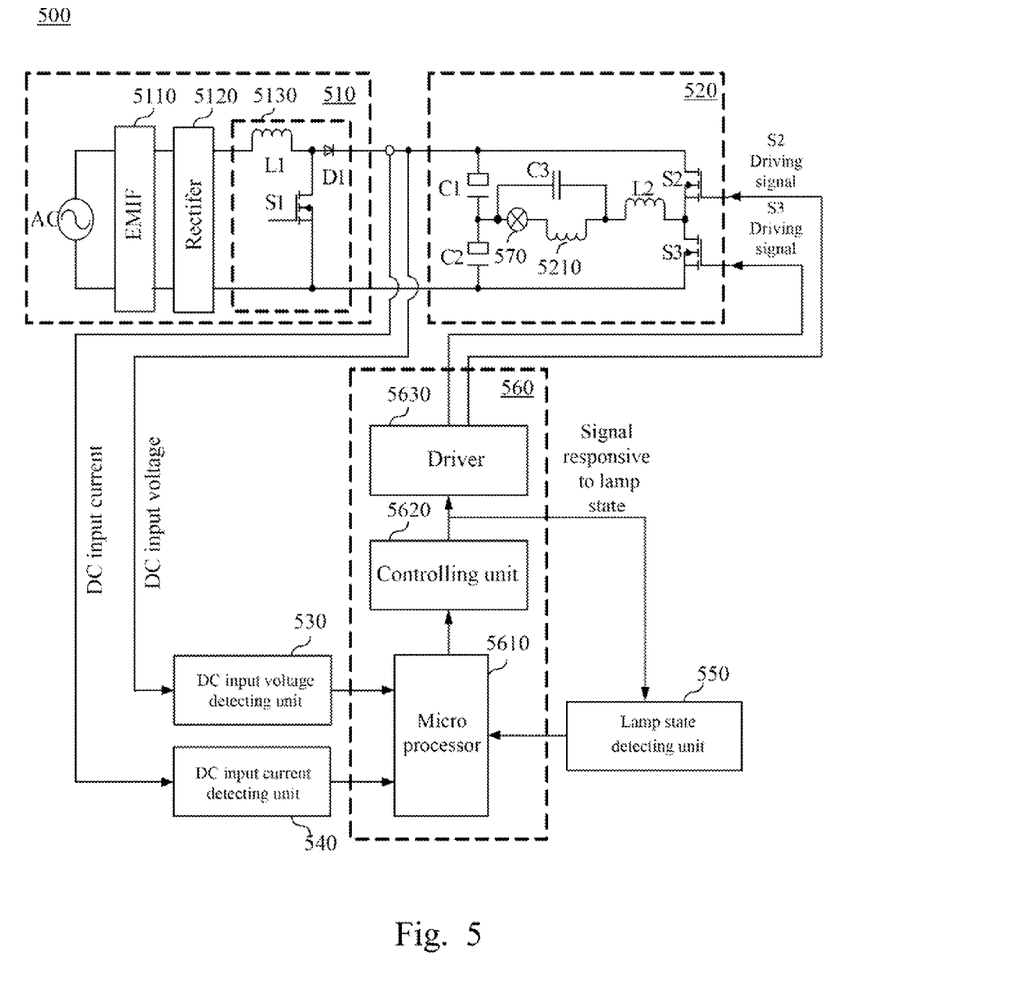
FIG. 5 shows a circuit block diagram of the discharge lamp system according to the first embodiment of the present disclosure.

Referring to FIG. 5, a circuit block diagram will be described that illustrates a discharge lamp system 500 according to the first embodiment of the present disclosure. The discharge lamp system 500 includes a power supply device 510, a converter 520, a DC input voltage detecting unit 530, a DC input current detecting unit 540, a lamp state detecting unit 550, a controller 560 and a discharge lamp 570.

The power supply device 510 includes a power source AC, an electromagnetic interference filter (EMIF) 5110, a rectifier 5120 and a power factor correction (PFC) circuit 5130, in which the power source AC can be an AC power source. One side of the EMIF 5110 is connected to the power source AC, for filtering an interference signal to the power source AC. One side of the rectifier 5120 is connected to the other side of the EMIF 5110, for converting an AC power provided by the power source AC into a DC power.

The PFC circuit 5130 includes an inductor L1, a diode D1 and a first metal oxide semiconductor field effect transistor (MOSFET) S1. The PFC circuit 5130 can be configured to perform a boost process to convert an input voltage of the PFC circuit 5130 into the DC input voltage outputted by the PFC circuit 5130. The DC input voltage is in the range of about 380 V to 420 V, and is preferably 400 V, in the present embodiment.

In one embodiment, the converter 520 can be a half-bridge inverter connected to the PFC circuit 5130, for converting the DC input voltage outputted by the PFC circuit 5130 into a voltage required by the discharge lamp 570. The half-bridge inverter 520 includes two electrolytic capacitors C1 and C2, an igniter 5210, an inductor L2, a capacitor C3, a second MOSFET S2 (also referred to as a switch S2 herein), and a third MOSFET S3 (also referred to as a switch S3 herein). The electrolytic capacitors C1 and C2 are connected in series with each other. The igniter 5210 is connected in series with the discharge lamp 570. The inductor L2 is connected in series with the discharge lamp 570. The capacitor C3 is connected in parallel with the discharge lamp 570. Furthermore, the DC input voltage detecting unit 530 and the DC input current detecting unit 540 are configured for detecting the DC input voltage and the DC input current provided by the power supply device 510. That is, the DC input voltage detecting unit 530 and the DC input current detecting unit 540 detect the output voltage and the output current of the PFC circuit 5130 in the present embodiment.

The controller 560 can include a microprocessor 5610, a controlling unit 5620 and a driver 5630. It is noted that a voltage value of the discharge lamp 570 can be obtained indirectly by a duty ratio of driving signals for the switches S2 and S3 according to an inductor voltage-second balance theory in the present embodiment. Thus, the lamp state detecting unit 550 can be a duty ratio detecting unit that performs detection on the basis of the duty ratio of the driving signals for the switches S2 and S3 in the present embodiment. That is, the lamp state detecting unit 550 detects the duty ratio of the driving signals for the switches S2 and S3. In the present embodiment, the duty ratio of the driving signals for the switches S2 and S3 can be obtained by detecting the controlling signal generated by the controlling unit 5620.

The following description illustrates the theory and actual controlling process for the constant power control of the discharge lamp 570 in the present embodiment. Because it is difficult to control a discharge lamp power $P_{lamp}$ directly, the constant power control is performed with respect to an output power $P_{PFC}$ of the PFC circuit 5130 (input power of the half-bridge inverter) so that the constant power control of the discharge lamp 570 can be performed indirectly. It can be known from the circuit that a relationship between the PFC output power $P_{PFC}$ and the discharge lamp power $P_{lamp}$ is shown as follows:

$$P_{lamp}=P_{PFC}*\eta=V_{DC}*I_{DC}*\eta \qquad (1)$$

where $V_{DC}$ is an output voltage (DC input voltage) of the PFC circuit 5130 (in the present embodiment, $V_{DC}$ is also referred to as a BUS voltage), $I_{DC}$ is an output current (DC input current) of the PFC circuit 5130, and $\eta$ is an efficiency of the half-bridge inverter 520. In the present embodiment, the half-bridge inverter efficiency $\eta$ is affected by the inductor L2 and the switches S2 and S3 because loss occurs mainly in the inductor L2 and the switches S2 and S3 in the half-bridge inverter 520.

Furthermore, the foregoing equation can be represented as the following equation:

$$\eta=\eta_1*\eta_2=(1-\Delta\eta_1)*(1-\Delta\eta_2) \qquad (2)$$

where $\eta_1$ and $\Delta\eta_1$ are correlated with the loss generated by a device passed through by a discharge lamp current. That is, $\eta_1$ and $\Delta\eta_1$ are correlated with the loss generated by the L2. Furthermore, $\eta_2$ and $\Delta\eta_2$ are correlated with the loss generated by a device of both ends of the BUS voltage ($V_{DC}$). That is, $\eta_2$ and $\Delta\eta_2$ are correlated with the loss generated by the switches S2 and S3.

Therefore, the following equation can be obtained by the foregoing equations:

$$P_{lamp}=V_{DC}*I_{DC}*\eta_1*\eta_2=V_{DC}*I_{DC}*91-\Delta\eta_1)*(1-\Delta\eta_2) \qquad (3)$$

In order to facilitate a calculation here, $\Delta\eta_1$ can be chosen to have a linear relationship with a lamp voltage $V_{lamp}$, and $\Delta\eta_2$ can be chosen to have a linear relationship with $V_{DC}$ as shown in equation (4) and equation (5):

$$\Delta\eta_1=-K_1*V_{lamp}+b_1 \qquad (4)$$

$$\Delta\eta_2=K_2*V_{DC}+b_2 \qquad (5)$$

The following equation can be obtained according to the foregoing equations (3), (4) and (5):

$$P_{lamp} \approx V_{DC} * I_{DC} * (1 + K_1 * V_{lamp} - K_2 * V_{DC} - b_1 - b_2) \quad (6)$$
$$= V_{DC} * I_{DC} * (1 + K_1 * V_{lamp} - K_2 * V_{DC} - b_3)$$

where $K_1$ and $K_2$ are constants and are compensated coefficients of the $V_{lamp}$ and the $V_{DC}$, respectively. That is, a compensation of $V_{lamp}$ is performed with the $K_1$ coefficient, and a compensation of $V_{DC}$ is performed with the $K_2$ coefficient. In addition, $b_1$, $b_2$ and $b_3$ are constants, and $b_3 = b_1 + b_2$.

In some embodiments, $\Delta\eta_1$ can be chosen to have a non-linear relationship with the lamp voltage $V_{lamp}$, and $\Delta\eta_2$ can be chosen to have a non-linear relationship with $V_{DC}$, and thus a corresponding compensated calculation can be obtained.

In the present embodiment, the following equation can be obtained according to the inductor voltage-second balance theory:

$$(V_{DC}/2 - V_{lamp}) * \text{duty ratio} = (V_{DC}/2 + V_{lamp}) * (1 - \text{duty ratio}) \quad (7)$$

It is noted that the duty ratio of the equation (7) can be the duty ratio of the driving signals for the switches S2 and S3 in the present embodiment. The duty ratio of the driving signals for the switches S2 and S3 can be obtained by detecting the controlling signal generated by the controlling unit 5620 through use of the lamp state detecting unit 550. This is possible because the duty ratio of the controlling signal generated by the controlling unit 5620 and that of the driving signals of the switches S2 and S3 are equal.

The equation (7) can be simplified as the following equations (8) and (9):

$$\text{duty ratio} = 0.5 + V_{lamp}/V_{DC} \quad (8)$$

$$V_{lamp} = (\text{duty ratio} - 0.5) * V_{DC} \quad (9)$$

Next, a relationship between $P_{lamp}$, $V_{DC}$ and duty ratio can be obtained by substituting the equation (9) into the equation (6). It can be understood that the constant power control of the output power of the PFC circuit 5130 can be achieved by performing the compensation of the $V_{DC}$ and the duty ratio, so that the constant power control of the discharge lamp 570 can be performed indirectly.

In the present embodiment, the DC input voltage detecting unit 530 and the DC input current detecting unit 540 detect the output voltage and the output current of the PFC circuit 5130, respectively, and transmit the detected values to the microprocessor 5610. The lamp state detecting unit 550 detects the driving signals of the switches S2 and S3, and feeds back the detected values (such as the duty ratio of the driving signals for the switches S2 and S3) to the microprocessor 5610. Subsequently, the microprocessor 5610 performs a processing procedure using the detected values of the DC input voltage, the DC input current and the duty ratio of the driving signals for the switches S2 and S3 according to the equation (6) and equation (9). That is, the discharge lamp power is calculated, and the processing signal is subsequently generated according to the discharge lamp power. The controlling unit 5620 is configured for generating the controlling signal according to the processing signal provided by the microprocessor 5610. The driver 5630 is configured for generating the driving signals according to the controlling signal provided by the controlling unit 5620, and the driving signals drive the switches S2 and S3.

Figure 6:
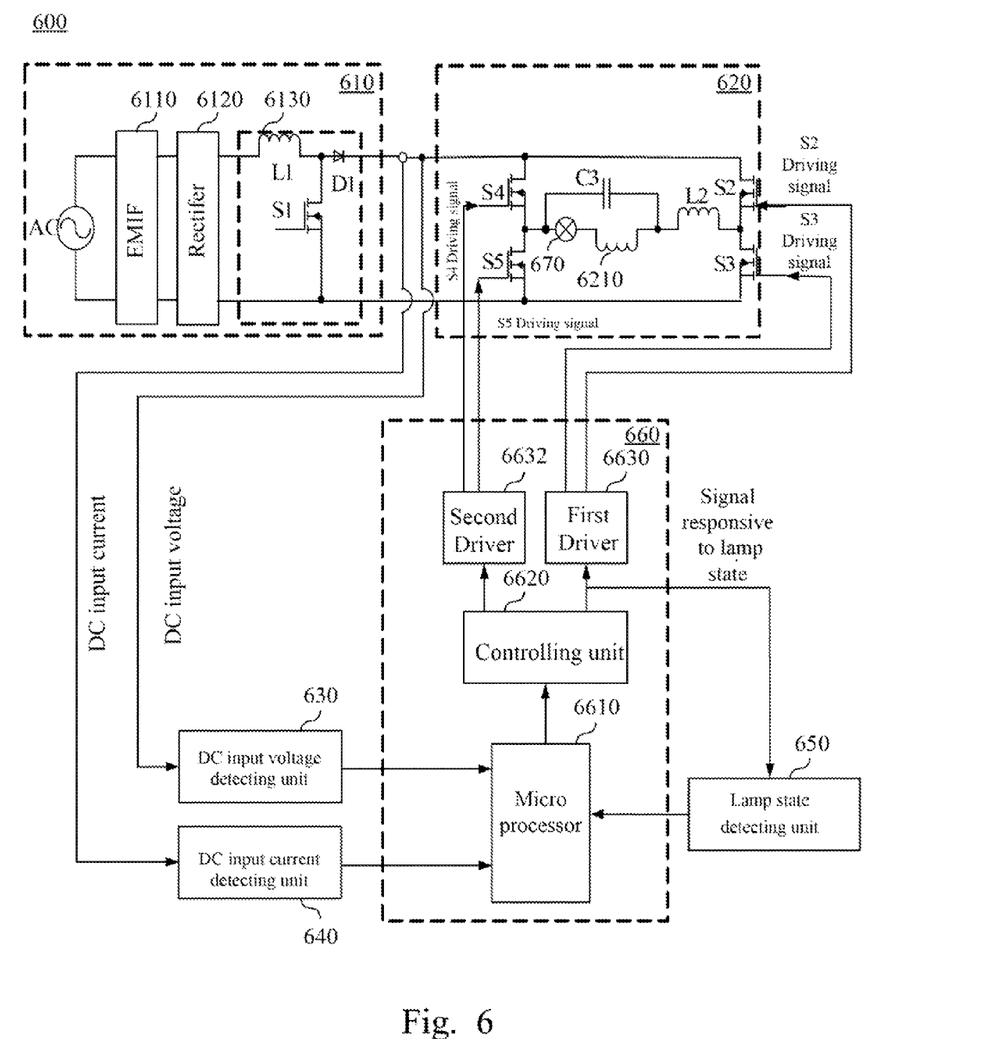
FIG. 6 shows a circuit block diagram of the discharge lamp system according to the second embodiment of the present disclosure.

Referring to FIG. 6, a circuit block diagram will be described that illustrates a discharge lamp system 600 according to the second embodiment of the present disclosure. The discharge lamp system 600 includes a converter 620 and a controller 660 in the present embodiment, and these elements are different from the corresponding elements in the discharge lamp system 500 as shown in FIG. 5. Furthermore, the discharge lamp system 600 includes a power supply device 610, a DC input voltage detecting unit 630, a DC input current detecting unit 640, a lamp state detecting unit 650 and a discharge lamp 670, and these elements are the same as or similar to the power supply device 510, the DC input voltage detecting unit 530, the DC input current detecting unit 540, the lamp state detecting unit 550 and the discharge lamp 570 of the discharge lamp system 500 of FIG. 5, respectively, and so will not be described again to simplify the description herein.

In the present embodiment, the converter 620 is a full-bridge inverter. That is, two MOSFETs (also referred to as switches herein) S4 and S5 are adopted for replacing the electrolytic capacitors C1 and C2 of the discharge lamp system 500 of FIG. 5. The switches S2 and S3 are operated under a high-frequency mode of about several tens of kilohertz (kHz) to several hundreds of kilohertz (kHz), and the operations are the same as the switches S2 and S3 in FIG. 5. However, the switches S4 and S5 are operated under a low-frequency mode of about 100 Hz to 400 Hz. The controller 660 includes a microprocessor 6610, a controlling unit 6620, a first driver 6630 and a second driver 6632. Similar to the corresponding elements of the embodiment described with reference to FIG. 5, the DC input voltage detecting unit 630 and the DC input current detecting unit 640 detect an output voltage and an output current of the PFC circuit 6130, respectively, and transmit the detected values to the microprocessor 6610. The lamp detecting unit 650 is a duty ratio detecting unit, for detecting a controlling signal outputted by the controlling unit 6620 so that a duty ratio of the driving signals for the switches S2 and S3 are obtained. After that, the lamp detecting unit 650 feeds back the detected values (such as the duty ratio of the driving signals for the two switches S2 and S3) to the microprocessor 6610. The microprocessor 6610 performs a processing procedure using detected values of the DC input voltage, the DC input current and the duty ratio of the driving signals for the switches S2 and S3 according to the equation (6) and equation (9). That is, a discharge lamp power is calculated, and a processing signal is subsequently generated according to the discharge lamp power. The controlling unit 6620 is configured for generating a first controlling signal and a second controlling signal according to the processing signals provided by the microprocessor 6610. The first driver 6630 is configured for receiving the first controlling signal provided by the controlling unit 6610 to generate the first driving signal in order to drive the high-frequency switches S2 and S3. The second driver 6632 is configured for receiving the second controlling signal provided by the controlling unit 6610 to generate the second driving signal in order to drive the low-frequency switches S4 and S5.

Figure 7:
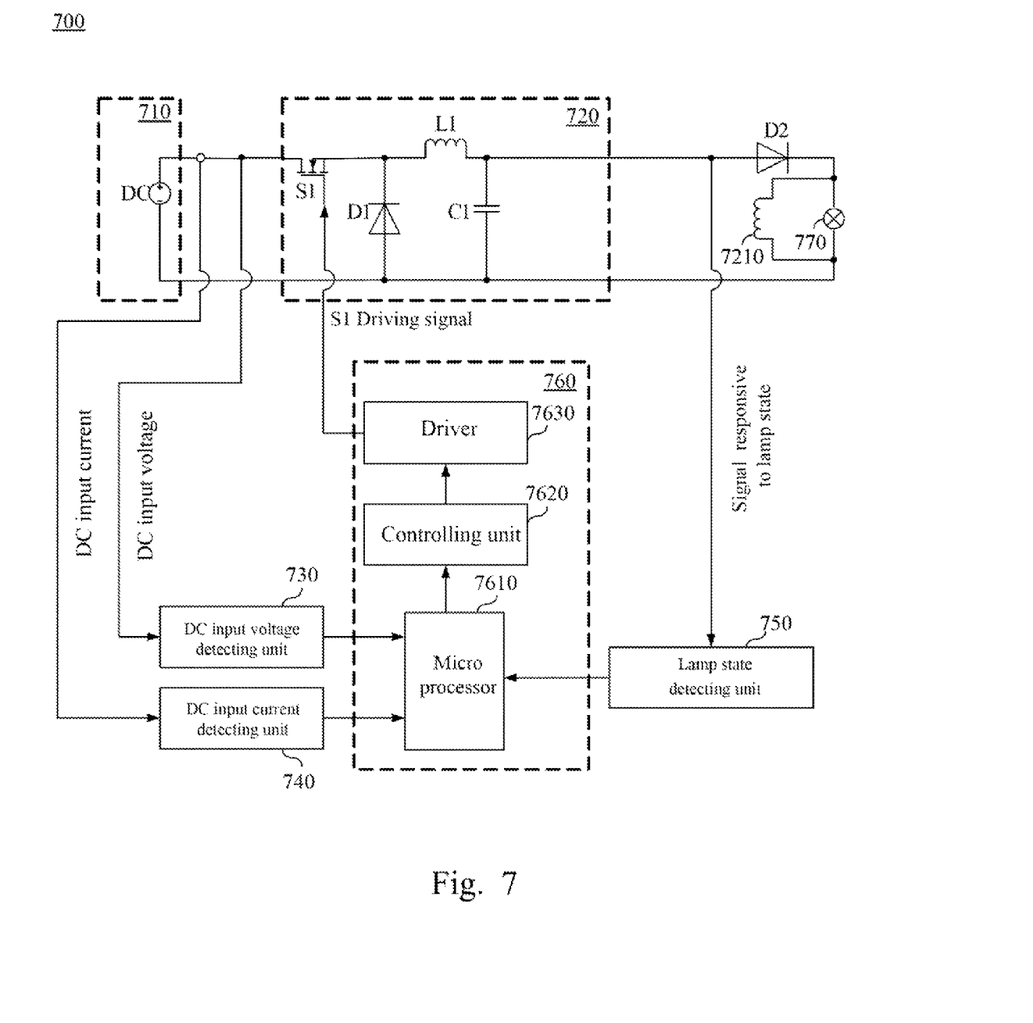
FIG. 7 shows a circuit block diagram of the discharge lamp system according to the third embodiment of the present disclosure.

Referring to FIG. 7, a circuit block diagram will be described that illustrates a discharge lamp system 700 according to the third embodiment of the present disclosure. The discharge lamp system 700 includes a power supply device 710, a converter 720, a DC input voltage detecting unit 730, a DC input current detecting unit 740, a lamp state detecting unit 750, a controller 760 and a discharge lamp 770. In the present embodiment, the power supply device 710 is a DC power source, for providing a DC input voltage and a DC input current. The DC input voltage is in the range about 380 V to 420 V. Preferably, the DC input voltage is 400 V.

In the present embodiment, the converter 720 is a DC-DC converter. Preferably, the converter 720 is a buck circuit (also referred to as a buck converter herein), in which one side of the buck circuit 720 is connected to an output of the DC power source, for converting the DC input voltage into a voltage required by the discharge lamp 770. The buck circuit 720 includes a MOSFET (i.e., a switch) S1, a first diode D1, an inductor L1 and a capacitor C1. In the present embodiment, an igniter 7210 is connected in parallel with the discharge lamp 770. The discharge lamp system 700 can further include a second diode D2 connected in series with the discharge lamp 770 to prevent a high voltage generated by the igniter 7210 from affecting other elements of the discharge lamp system 700 during an igniting process.

In the present embodiment, the controller 760 includes a microprocessor 7610, a controlling unit 7620 and a driver 7630. It is noted that the lamp state detecting unit 750 is configured for detecting an output voltage of the buck circuit 720 such as a discharge lamp voltage $V_{lamp}$.

In the present embodiment, power control is not performed by directly controlling a discharge lamp power $P_{lamp}$, but rather, is performed by controlling an input power of the buck circuit 720 as follows:

$$P_{lamp} = Vin * Iin * \eta_3 \qquad (10)$$

where $P_{lamp}$ is the discharge lamp power, $V_{in}$ is the DC input voltage (input voltage of the buck circuit 720) such as the output voltage of the DC power source, $I_{in}$ is the DC input current (input current of the buck circuit 720) such as the output current of the DC power source, and $\eta_3$ is an efficiency of the buck circuit 720.

The equation (10) can be represented as the following equation:

$$P_{lamp} = Vin * Iin * \eta_4 * \eta_5 \qquad (11)$$

where $\eta_4$ is the efficiency related to the discharge lamp voltage, and $\eta_5$ is the efficiency related to the $V_{in}$ (BUS voltage).

Likewise, the following equation can be obtained in the same manner as that described with reference to the foregoing embodiment as shown in FIG. 5:

$$P_{lamp} \approx V_{in} * I_{in} * (1 + K_4 * V_{lamp} - K_3 * V_{in} - b_4) \qquad (12)$$

where $K_4$ and $K_3$ are constants, and $b_4$ is a constant. $K_4$ and $K_3$ are compensated coefficients of $V_{lamp}$ and $V_{in}$, respectively. That is, compensation is performed with the $K_4$ coefficient with respect to $V_{lamp}$, and compensation is performed with the $K_3$ coefficient with respect to $V_{in}$.

Thus, the constant power control of the discharge lamp 770 can be performed by compensating the $V_{lamp}$ and the $V_{DC}$. In some embodiments, $\eta_4$ can be chosen to have a non-linear relationship with the $V_{lamp}$ and $\eta_5$ can be chosen to have a non-linear relationship with the $V_{in}$, and a corresponding compensated calculation can still be obtained.

In the present embodiment, the DC input voltage detecting unit 730 and the DC input current detecting unit 740 detect the input voltage $V_{in}$ and the input current $I_{in}$ of the buck circuit 720, respectively, and transmit the detected values to the microprocessor 7610. The lamp state detecting unit 750, that is, an output voltage detecting unit, detects the output voltage (which is about the lamp voltage $V_{lamp}$) of the buck circuit 720, and feeds back the detected value to the microprocessor 7610. The microprocessor 7610 performs a processing procedure using detected values of the DC input voltage, the DC input current and the output voltage of the buck circuit 720 received by the microprocessor 7610 according to the equation (12). That is, a discharge lamp power is calculated, and subsequently a processing signal is generated according to the discharge lamp power. The controlling unit 7620 is configured for generating a controlling signal according to the processing signal provided by the microprocessor 7610. The driver 7630 is configured for generating a driving signal according to the controlling signal provided by the controlling unit 7620, and the driving signal is used for driving the switch S1.

In the present embodiment, the compensation of $V_{in}$ is used to realize the constant power control of the discharge lamp 770, and the experimental data can be obtained as shown in Table 1:

TABLE 1

| | $P_{lamp}$ | | | |
|---|---|---|---|---|
| | With compensation of $V_{in}$ | | Without compensation of $V_{in}$ | |
| $V_{lamp}$ | $V_{in}$ = 380 V | $V_{in}$ = 400 V | $V_{in}$ = 380 V | $V_{in}$ = 400 V |
| 80 V | 227.4 W | 227.3 W | 228.3 W | 241.3 W |
| 90 V | 227.2 W | 227.3 W | 228.5 W | 241.5 W |
| 100 V | 227.3 W | 227.4 W | 229.4 W | 241.2 W |

As is evident from Table 1 above, better accuracy with respect to constant power control of the discharge lamp 770 can be realized when compensation of $V_{in}$ is performed compared to when compensation of $V_{in}$ is not performed. Thus, the advantage of the present disclosure can be achieved.

Figure 8:
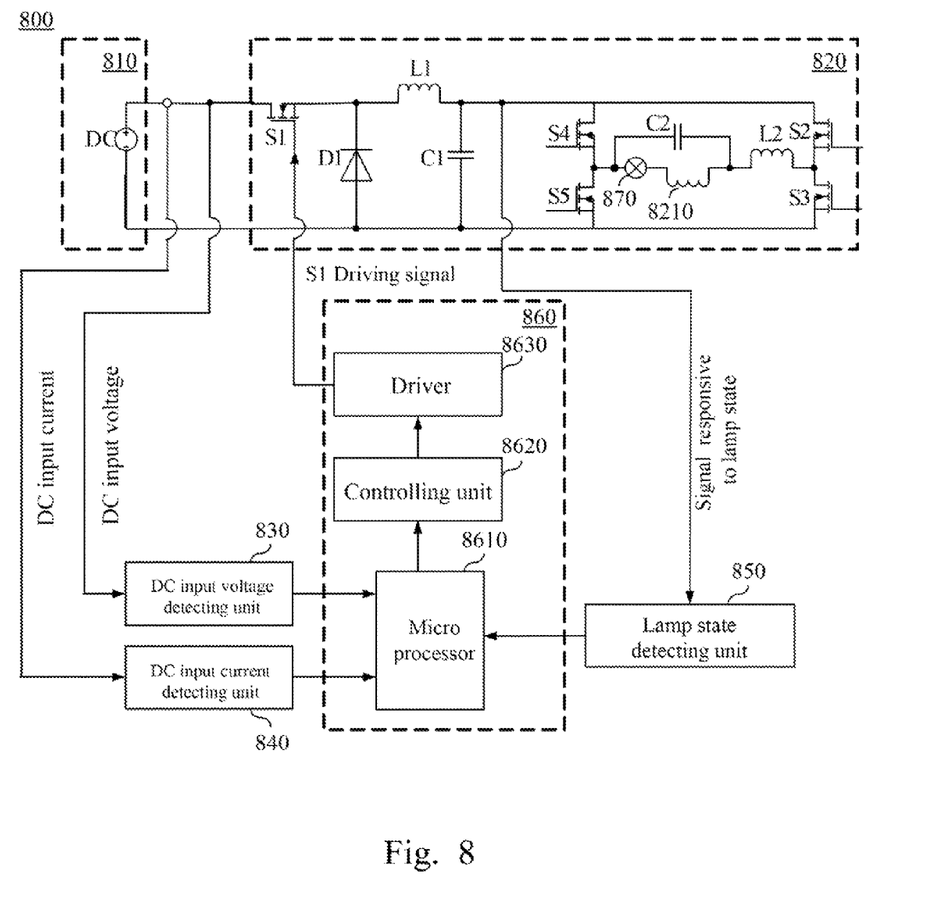
FIG. 8 shows a circuit block diagram of the discharge lamp system according to the fourth embodiment of the present disclosure.

Referring to FIG. 8, a circuit block diagram will be described that illustrates a discharge lamp system 800 according to the fourth embodiment of the present disclosure. The discharge lamp system 800 includes a converter 820, which is different from the corresponding element in the discharge lamp system 700 as shown in FIG. 7. The converter 820 not only includes a buck circuit but also includes a full-bridge inverter connected to the buck circuit. That is, the converter 820 is formed of the combination of the buck circuit and the full-bridge inverter.

In the present embodiment, the full-bridge inverter includes an igniter 8210 connected in series with a discharge lamp 870, and this is different from the foregoing embodiment as shown in FIG. 7, where the igniter 7210 and the discharge lamp 770 are connected in parallel. It can be understood that a power supply device 810, a DC input voltage detecting unit 830, a DC input current detecting unit 840, a lamp state detecting unit 850 and the discharge lamp 870 are the same as or similar to the power supply device 710, the DC input voltage detecting unit 730, the DC input current detecting unit 740, the lamp state detecting unit 750 and the discharge lamp 770 of the discharge lamp system 700 as shown in FIG. 7, respectively, and so will not be described again to simplify the description herein.

It can be seen that the power supply device, in the present disclosure, can be a combination of an AC power source and other circuit elements, or a DC power source, and its inclusion within the discharge lamp system as described herein is not intended to limit the present disclosure as long as the DC input voltage and the DC input current provided by the power supply device can meet the requirements of the discharge lamp system. Further, the converter 820 can be a half-bridge inverter, a full-bridge inverter, a buck circuit, a combination of a buck circuit and a full-bridge circuit, and a combination of a buck circuit and a half-bridge inverter, and the description provided herein is not intended to limit a circuit topology thereof.

Figure 9:
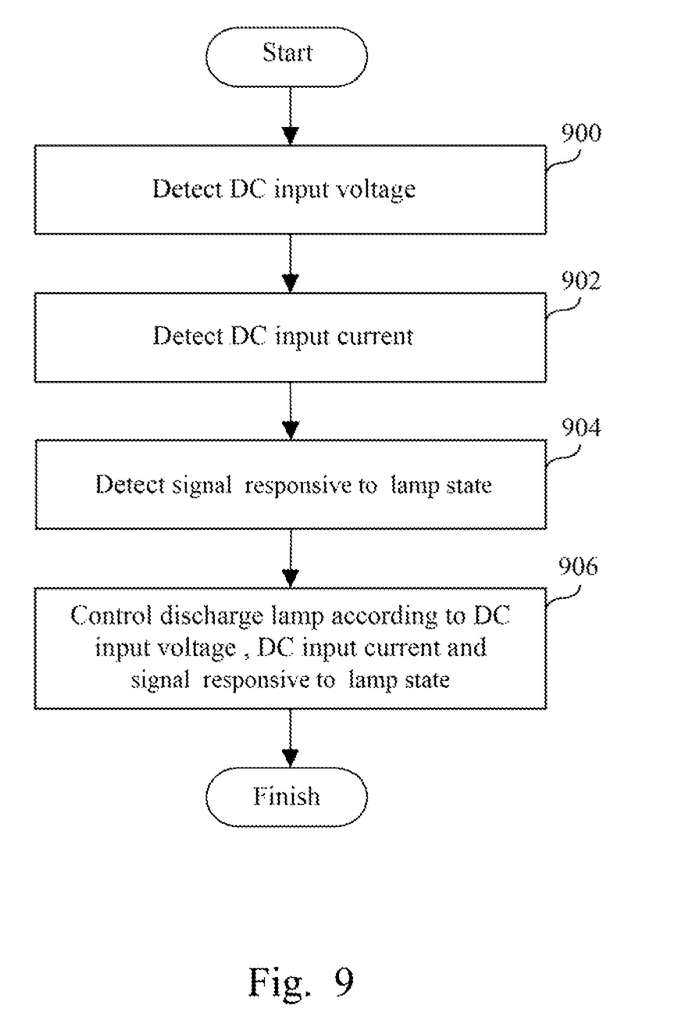
FIG. 9 shows a flow diagram of a method for controlling the discharge lamp system according to one embodiment of the present disclosure.

Referring to FIG. 9, a flow diagram will be described that illustrates a method for controlling the discharge lamp system according to one embodiment of the present disclosure. The routine begins at operation 900, where a DC input voltage is detected. From operation 900, the routine continues to operation 902, where a DC input current is detected. The routine then continues to operation 904, where a signal responsive to a lamp state is detected. Subsequently, at operation 906, a discharge lamp is controlled according to detected values of the DC input voltage, the DC input current and the signal responsive to the lamp state, where the controlling process is a constant power control operation, and particularly, compensation of one or more of the DC input voltage, the DC input current and the lamp state is performed.

The signal responsive to the lamp state can be a duty ratio of the driving signal for the switch or the output voltage of the buck circuit illustrated in the foregoing embodiment, that is, the signal responsive to the lamp state can be a signal responsive to a lamp voltage. It can be understood that the sequence of operations 900, 902 and 904 in the present embodiment are not intended to limit the method as shown in FIG. 9. For example, the detecting procedures of the DC input voltage, the DC input current and the signal responsive to the lamp state can be performed in any arbitrary sequence, or alternatively, the detecting procedures can be performed at substantially the same time as part of the same operation.

In the discharge lamp system and the controlling method thereof of the present disclosure, compensation of one or more of the DC input voltage, the DC input current and the signal responsive to the lamp state is performed so as to control the input power of the converter and thereby realize indirect constant power control of the discharge lamp. It can be seen from the experimental data that the discharge lamp can be controlled stably by utilizing the techniques described in the present disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A discharge lamp system, comprising:
    a discharge lamp;
    a power supply device for providing a DC input voltage and a DC input current;
    a converter connected to the power supply device and the discharge lamp, for providing power to the discharge lamp;
    a DC input voltage detecting unit connected to the power supply device, for detecting the DC input voltage;
    a DC input current detecting unit connected to the power supply device, for detecting the DC input current;
    a lamp state detecting unit for detecting a signal responsive to a lamp state; and
    a controller connected to the converter, the DC input voltage detecting unit, the DC input current detecting unit and the lamp state detecting unit, for generating a controlling signal according to the DC input voltage, the DC input current and the signal responsive to the lamp state, so as to perform a constant power control of the discharge lamp through the converter in accordance to the controlling signal, wherein the constant power control of the discharge lamp is achieved by compensating the DC input voltage, the DC input current and the signal responsive to the lamp state.

2. The discharge lamp system of claim 1, wherein the lamp state detecting unit is configured for detecting a duty ratio signal generated by the controller or detecting a signal responsive to a lamp voltage.

3. The discharge lamp system of claim 1, wherein the power supply device is a DC power source.

4. The discharge lamp system of claim 1, wherein the power supply device comprises:
    an AC power source for providing an AC power: and
    a rectifier coupled to the AC power source, for converting the AC power into a DC power.

5. The discharge lamp system of claim 4, wherein the power supply device further comprises:
    a power factor correction circuit connected to the rectifier, for providing the DC input voltage.

6. The discharge lamp system of claim 1, wherein the compensation of the DC input voltage, the DC input current and the lamp state is a linear compensation or a non-linear compensation.

7. The discharge lamp system of claim 6, wherein the converter is a half-bridge inverter comprising two switches.

8. The discharge lamp system of claim 7, wherein the controller comprises:
    a microprocessor connected to the DC input voltage detecting unit, the DC input current detecting unit and the lamp state detecting unit, for generating a processing signal according to the DC input voltage, the DC input current and the signal responsive to the lamp state;
    a controlling unit coupled to the microprocessor, for generating a controlling signal according to the processing signal; and
    a driver connected to the controlling unit, for generating a driving signal according to the controlling signal, the driving signal driving the switches.

9. The discharge lamp system of claim 8, wherein the lamp state detecting unit is a duty ratio detecting unit, for detecting the controlling signal and thereby acquiring the duty ratio of the driving signal corresponding to the switches, and for providing the signal responsive to the lamp state corresponding to the duty ratio of the driving signal.

10. The discharge lamp system of claim 6, wherein the converter is a full-bridge inverter comprising two high-frequency switches and two low-frequency switches.

11. The discharge lamp system of claim 10, wherein the controller comprises:
    a microprocessor connected to the DC input voltage detecting unit, the DC input current detecting unit and the lamp state detecting unit, for generating a processing signal according to the DC input voltage, the DC input current and the signal responsive to the lamp state;
    a controlling unit connected to the microprocessor, for generating a first controlling signal and a second controlling signal according to the processing signal; and
    a first driver and a second driver connected to the controlling unit, wherein the first driver receives the first controlling signal and thereby generates a first driving signal corresponding to the first controlling signal to drive the high-frequency switches, and the second driver receives the second controlling signal and thereby generates a second driving signal corresponding to the second controlling signal to drive the low-frequency switches.

12. The discharge lamp system of claim 11, wherein the lamp state detecting unit is a duty ratio detecting unit, for detecting the first controlling signal and thereby acquiring the duty ratio of the first driving signal corresponding to the high-frequency switches, and for providing the signal responsive to the lamp state corresponding to the duty ratio of the first driving signal.

13. The discharge lamp system of claim 6, wherein the converter comprises a DC-DC converter.

14. The discharge lamp system of claim 13, wherein the DC-DC converter is a buck converter.

15. The discharge lamp system of claim 14, wherein the lamp state detecting unit is an output voltage detecting unit, for detecting an output voltage of the buck converter, and for providing the signal responsive to the lamp state according to the output voltage.

16. A method for controlling the discharge lamp system of claim 1, the method comprising:
    detecting the DC input voltage, the DC input current and the signal responsive to the lamp state; and
    obtaining a controlling signal according to the DC input voltage, the DC input current and the signal responsive to the lamp state, and controlling the discharge lamp by the controlling signal.

17. The method of claim 16, wherein the operation of controlling the discharge lamp is a constant power control operation.

18. The method of claim 17, wherein the constant power control operation comprises performing a compensation of the DC input voltage, the DC input current and the lamp state.

19. The method of claim 16 wherein the signal responsive to the lamp state is a duty ratio signal.

20. The method of claim 16, wherein the signal responsive to the lamp state is a signal responsive to a lamp voltage.

* * * * *